United States Patent
Kawabe et al.

(10) Patent No.: US 9,177,582 B1
(45) Date of Patent: Nov. 3, 2015

(54) MAGNETIC DISK APPARATUS AND OFF-TRACKING DETECTION METHOD

(71) Applicant: Kabushiki Kaisha Toshiba, Minato-ku, Tokyo (JP)

(72) Inventors: Takayuki Kawabe, Sagamihara Kanagawa (JP); Masahide Kanegae, Fujisawa Kanagawa (JP)

(73) Assignee: Kabushiki Kaisha Toshiba, Minato-Ku, Tokyo (JP)

( * ) Notice: Subject to any disclaimer, the term of this patent is extended or adjusted under 35 U.S.C. 154(b) by 0 days.

(21) Appl. No.: 14/694,422

(22) Filed: Apr. 23, 2015

Related U.S. Application Data (60) Provisional application No. 62/110,093, filed on Jan. 30, 2015.

(51) Int. Cl.
  *G11B 5/596* (2006.01)
  *G11B 19/04* (2006.01)

(52) U.S. Cl.
  CPC .......... *G11B 5/59694* (2013.01); *G11B 19/045* (2013.01)

(58) Field of Classification Search
  None
  See application file for complete search history.

(56) References Cited

U.S. PATENT DOCUMENTS

| | | | |
|---|---|---|---|
| 5,132,854 A | 7/1992 | Tsuyoshi et al. | |
| 6,208,480 B1 * | 3/2001 | Tigner | 360/63 |
| 6,226,140 B1 * | 5/2001 | Serrano et al. | 360/60 |
| 6,351,342 B1 * | 2/2002 | Elliott et al. | 360/77.08 |
| 6,496,315 B1 * | 12/2002 | Ueda et al. | 360/60 |
| 6,567,233 B1 * | 5/2003 | Chew et al. | 360/60 |
| 6,714,371 B1 * | 3/2004 | Codilian | 360/60 |
| 6,952,322 B1 * | 10/2005 | Codilian et al. | 360/77.05 |
| 7,224,543 B1 * | 5/2007 | Abrishamchian et al. | 360/60 |
| 7,245,448 B2 | 7/2007 | Urata | |
| 7,426,086 B2 * | 9/2008 | Tobari et al. | 360/53 |
| 8,315,006 B1 * | 11/2012 | Chahwan et al. | 360/60 |
| 8,767,332 B1 * | 7/2014 | Chahwan et al. | 360/60 |
| 8,913,338 B1 * | 12/2014 | Chahwan et al. | 360/60 |
| 9,064,526 B1 | 6/2015 | Kawabe et al. | |

* cited by examiner

*Primary Examiner* — Wayne Young
*Assistant Examiner* — James L Habermehl
(74) *Attorney, Agent, or Firm* — David M. Tennant (57) ABSTRACT

In a disk apparatus, media include first and second surfaces having first and second servo patterns which are read at different timings by first and second heads. A controller controls the first head based on a first demodulated position obtained by demodulating the first servo pattern and a target position. The controller calculates a first estimated demodulated position from the demodulated position and a first demodulated velocity based on the first servo patterns, calculates a second estimated demodulated position from the first demodulated position and a second demodulated velocity based on the second servo patterns, and stops writing operation of the first head in accordance with one of the first and second estimated demodulated positions exceeding a threshold.

12 Claims, 7 Drawing Sheets

MAGNETIC DISK APPARATUS AND OFF-TRACKING DETECTION METHOD

CROSS-REFERENCE TO RELATED APPLICATIONS

This application claims the benefit of U.S. Provisional Application No. 62/110,093, filed Jan. 30, 2015, the entire contents of which are incorporated herein by reference.

FIELD

Embodiments described herein relate generally to a magnetic disk apparatus and an off-tracking detection method.

BACKGROUND

In recent years, in the field of disk storage apparatuses such as hard disk drives (hereinafter, simply as disk drives), higher recording densities of a magnetic disk as a storage medium have been promoted. In a disk drive, generally, the sector servo system is adopted and a large number of circular cylinders (i.e. tracks) including servo sectors are arranged concentrically on the magnetic disk. The servo sector includes a servo area and a user data area subsequent to the servo area. A servo pattern to detect position of a magnetic head over the magnetic disk is recorded in the servo area. The servo pattern includes a preamble pattern, address data containing a cylinder number and a servo sector number, and a burst pattern.

There is known a staggered servo system which is one of variations of the sector servo system. In a magnetic disk apparatus in the staggered servo system, both sides of the magnetic disk are used as a recording surface respectively and the magnetic head is provided over both sides of the magnetic disk respectively. There is provided a positional difference between the servo sectors on the both sides of the magnetic disk along the circumferential direction of the disk and the servo areas are also recorded on the both side so as to have a positional difference in the circumferential direction depending on the positions of the sectors.

In such a magnetic disk apparatus, one of the magnetic heads is activated and the servo pattern is sampled at servo sampling intervals by the magnetic head from the corresponding recording surface of the magnetic disk. The magnetic head is positioned to the target track based on the sampled servo pattern. More specifically, a demodulated position and an estimated position of the magnetic head are determined from address data contained in the servo pattern sampled at servo sampling intervals and a demodulated velocity and servo control to the target track position of the magnetic head is exercised. Then, if off-tracked writing error in which the magnetic head is drifted over a permissible position error (threshold $d_p$) is detected in the servo control while writing data, the magnetic head is disabled to write data.

In the servo control involving off-tracking detection of the magnetic head as described above, even if a rapid velocity change of the magnetic head is caused and off-tracked writing error is occurred after the magnetic head passes particular servo sample, the detection of the off-tracking is delayed to the next servo sample. Accompanying such a delay of off-tracking detection, data writing may continue even if the magnetic head is over an adjacent track due to off-tracking, resulting in deletion of data of the adjacent track. In addition, if the servo sampling interval is set small to minimize the delay of off-tracking detection, the user data area is decreased.

DETAILED DESCRIPTION

Magnetic disk apparatuses according to various embodiments will be described with reference to the drawings.

In general, according to one embodiment, there is provided a disk apparatus comprising a first medium having a first disk surface on which first servo patterns are recorded, wherein the first servo patterns are to be read at a first timing and data is to be wrote on the first disk surface by using a first head, a second medium having a second disk surface on which second servo patterns are recorded, wherein the second servo patterns are to be read at a second timing different from the first timing by using a second head, and a controller to control the first head based on a first demodulated position and a control target position, the first demodulated position being obtained by demodulating the first servo pattern, wherein the controller calculates a first estimated demodulated position from the first demodulated position and a first demodulated velocity based on the first servo patterns, calculates a second estimated demodulated position from the first demodulated position and a second demodulated velocity based on the second servo patterns, each of the second servo patterns being read after reading each of the first servo pattern, and stops data writing operation of the first head in accordance with one of the first and second estimated demodulated positions exceeding a particular threshold.

[Configuration of the Disk Drive]

Figure 1:
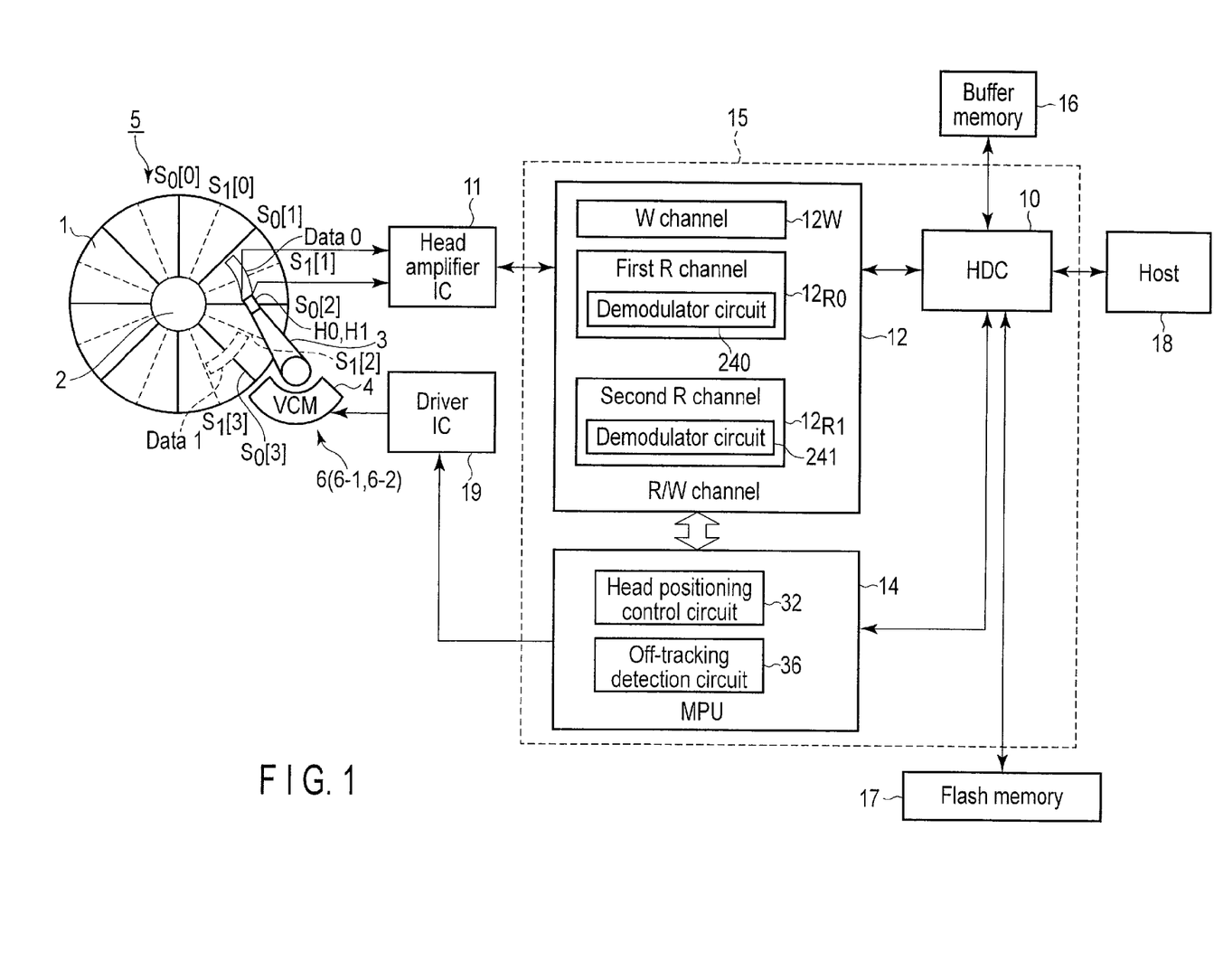
FIG. 1 is a block diagram schematically showing configuration of a magnetic disk apparatus according to an embodiment.

FIG. 1 schematically shows a disk storage apparatus (disk drive) according to a present embodiment.

The disk drive includes a head-disk assembly (HDA) 5, a head amplifier integrated circuit (hereinafter, referred to as a head amplifier IC) 11, and a system controller 15 configured as a 1-chip integrated circuit. The system controller 15 includes a hard disk controller (HDC) 10, a read/write (R/W) channel 12, and a microprocessor (MPU) 14.

The HDA 5 includes a disk 1 as a storage medium, a spindle motor (SPM) 2, an arm mechanism 3 including first and second arms on which heads H0, H1 are mounted respectively, and a voice coil motor (VCM) 4. The arm mechanism 3 and the VCM 4 constitutes a head positioning mechanism 6 for head positioning that positions the heads H0, H1.

Figure 2:
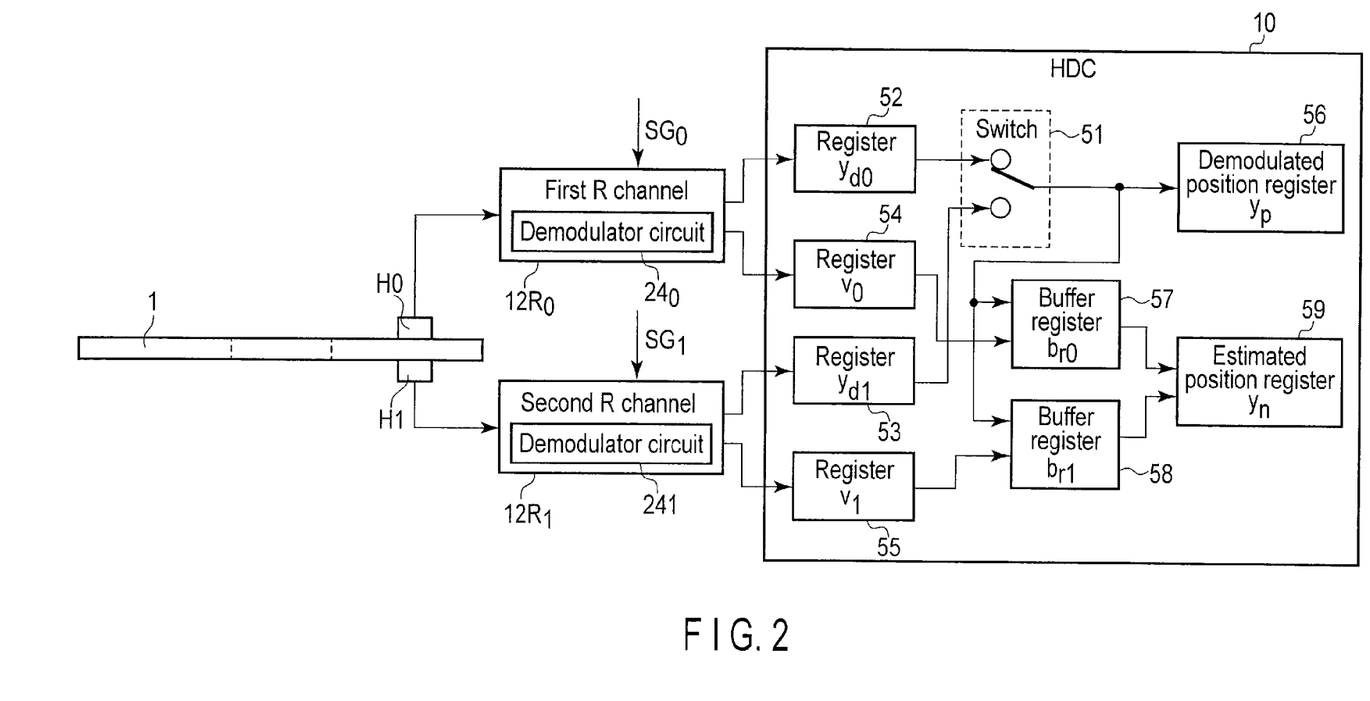
FIG. 2 is a block diagram schematically showing configuration of a hard disk controller (HDC) shown in FIG. 1.

The disk 1 is rotated by the spindle motor 2. The heads H0, H1 mounted on the arm mechanism 3 are swung by driving of the VCM 4 and moved on the disk 1. The heads H0, H1 are arranged, as shown in FIG. 2, opposite to each other on one side and the other side of the disk 1 and one of the heads H0, H1 is selected and the selected head is controlled to be positioned in a target position r.

Each of the heads H0, H1 is constituted of a write head and a read head mounted on a slider. The read head reads data recorded on the disk 1 and the write head writes data on the disk 1.

The sector servo system is adopted for the disk drive. Thus, cylinders (tracks) on which data is recorded are concentrically provided on one side of the disk 1 of the HDA 5. On one side of the disk 1, as indicated by a solid line, servo patterns $S_0[0]$, $S_0[1]$, $S_0[2]$, $S_0[3]$ ... $S_0[k]$ (hereinafter, referred to simply as the first servo pattern) are so recorded as to be extended along a substantially radial direction. The cylinder is divided into a plurality of sectors along the circumferential direction by the first servo pattern. Then, the sector between the servo patterns $S_0[k-1]$, $S_0[k]$ is defined as a user data area capable of recording, for example, user data [0] (Data0) indicated by a solid line in FIG. 1. Similarly, cylinders (i.e., tracks) on which data is recorded are concentrically provided on the other side of the disk 1. On the other side of the disk 1, as indicated by a broken line, servo patterns $S_1[0]$, $S_1[1]$, $S_1[2]$, $S_1[3]$ ... $S_1[k]$ (hereinafter, referred to simply as the second servo pattern) are so recorded as to be extended along the substantially radial direction. The cylinder is also divided into a plurality of sectors along the circumferential direction by the second servo pattern. The sector between the servo patterns $S_1[k-1]$, $S_1[k]$ is defined as a user data area capable of recording, for example, user data [1](Data1) indicated by a broken line in FIG. 1.

Servo data is recorded in the first and second servo patterns. Servo AGC, a servo mark, and a servo address containing track address data and sector address data are recorded in the servo data and a burst is recorded subsequent to the servo address.

The staggered servo system is adopted for the disk drive in the present embodiment and the sectors are so arranged on both sides of the disk 1 as to form sector arrays which are not aligned on both sides and are shifted in a circumferential direction. Similarly, the first and second servo patterns are recorded on the sectors so as to have shifted arrangements in the circumferential direction. In other words, the first servo pattern and the second servo pattern are written on the front side and the back side of the disk 1 such that first and second read signals are read from the first and second servo patterns to have a phase difference (for example, a phase difference of 180 degrees).

The head amplifier IC 11 includes a read amplifier and a write driver. The read amplifier amplifies a read signal read by the read head and sends the signal to the read/write (R/W) channel 12. On the other hand, the write driver supplies a write current in accordance with write data output from the R/W channel 12 to one write head of the heads H0, H1 selected as the main head. While the write head of the main head (one of the heads H0, H1) writes, a read signal is output from the read head of the main head. A read signal is also output from the read head of the head H0 or H1 selected as a sub-head differently from the main head.

As shown in FIG. 1, a driver IC is provided separately from the head amplifier IC 11 and the driver IC supplies a driving current (voltage) corresponding to a servo control amount u described later to drive the VCM 4.

The R/W channel 12 is configured by a multi-channel to realize a staggered servo. As shown in FIG. 1, the R/W channel 12 includes first and second R channels $12R_0$, $12R_1$ and a W channel 12W. The first and second R channels $12R_0$, $12R_1$ process a read signal read from tracks via the heads H0, H1 by the multi-channel and perform a data reproducing operation to decode data from the read signal. The W channel 12W is commonly provided for the heads H0, H1 to perform signal processing of write data. Two channels of the W channel 12W may be provided in the R/W channel 12 to supply write data to each of the heads H0, H1.

In the apparatus shown in FIG. 1, only the one disk 1 is illustrated, but a plurality of the disks 1 may be provided. When the plurality of disks 1 is provided, each disk may include a recording surface on one side or both sides. The W channel 12W and two R channels $12R_0$, $12R_1$ are used for the head corresponding to each recording surface.

A signal read from a servo address or a burst is amplified by the read channels $12R_0$, $12R_1$ and supplied to demodulator circuits 240, 241.

The HDC 10 is configured, as shown in FIG. 1, to control data transfer between a host 18 and the R/W channel 12. The HDC 10 controls a buffer memory (for example, DRAM: dynamic random access memory) 16 to temporarily store read data and write data in the buffer memory 16. Thus, the HDC 10 controls data transfer. The HDC 10 also controls a flash memory 17 to use the memory as a firmware storage area of, for example, programs and apparatus parameters.

The read channels $12R_0$, $12R_1$ fetch, as shown in FIG. 2, servo data from the first and second servo patterns in response to servo gate signals $SG_0$, $SG_1$ generated in the R/W channel 12 respectively. The servo gate signals $SG_0$, $SG_1$ are supplied to the read channels $12R_0$, $12R_1$ respectively. A servo address signal from servo data is demodulated (decoded) by the demodulator circuits 240, 241 and demodulated positions $y_{d0}$, $y_{d1}$ obtained by adding disturbances $w_0$, $w_1$ to absolute positions $y_0$, $y_1$ of the heads H0, H1 are output from the read channels $12R_0$, $12R_1$ to the HDC 10 respectively.

Similarly, demodulated velocity $v_0$, $v_1$ of the heads H0, H1 are operated based on servo data from the first and second servo patterns. These demodulated velocity $v_0$, $v_1$ are output from the read channels $12R_0$, $12R_1$ to the HDC 10. The demodulated velocity $v_0$, $v_1$ correspond to the amount of change from the previous demodulated position to the current demodulated position. The previous demodulated position is obtained by demodulating servo data sampled in the previous sampling timing immediately before the current sampling timing. The current demodulated position is obtained by demodulating servo data sampled in the current sampling timing.

The HDC 10 includes, as shown in FIG. 2, registers 52, 53 in which the demodulated positions $y_{d0}$, $y_{d1}$ are stored and registers 54, 55 in which the demodulated velocity $v_0$, $v_1$ are stored.

The registers 52, 53 are connected to a demodulated position register 56 via a switch 51 for selecting the registers 52, 53. The demodulated positions $y_{d0}$, $y_{d1}$ and the demodulated velocity $v_0$, $v_1$ are updated in accordance with the sampling timing of the first and second servo patterns. When the head H0 is selected as the main head to be controlled and the head H1 is selected as the sub-head, the switch 51 is connected to the register 52 side and the demodulated position $y_{d0}$ of the head H0 is stored in the demodulated position register 56 as the main demodulated position ($y_p = y_{d0}$). When the head H1 is selected as the main head, on the other hand, the head H0 is selected as the sub-head and the switch 51 is connected to the register 53 side and the demodulated position $y_{d1}$ of the head H1 is stored in the demodulated position register 56 as the main demodulated position ($y_p = y_{d1}$). In any case, off-tracking is detected based on the main demodulated position $y_p$ stored in the demodulated position register 56 and data writing is disabled.

With the selection of the head H0 or H1, the demodulated position $y_{d0}$ or the demodulated position $y_{d1}$ selected as the main demodulated position is transferred to buffer registers 57, 58 to which the registers 54, 55 in which the demodulated velocity $v_0$, $v_1$ are stored are connected respectively. The main or sub-demodulated velocity $v_0$, $v_1$ is alternately added in predetermined timing to the demodulated position $y_{d0}$ or the demodulated position $y_{d1}$ selected as the main demodulated position to determine a main estimated position $y_n$ and a sub-estimated position $y'_n$. The main and sub-estimated positions $y_n$, $y'_n$ are alternately stored in an estimated position register 59. The main demodulated position ($y_p = y_{d0}$ or $y_{d1}$) in the demodulated position register 56 and the main and sub-estimated positions $y_n$, $y'_n$ in the estimated position register 59 are used for detection of off-tracking by the MPU 14.

The MPU 14 shown in FIG. 1 is a main controller of the disk drive and exercises servo control of controlling the VCM 4 to position the heads H0, H1 and disables writing of write data when off-tracking is detected. More specifically, the MPU 14 constitutes, a shown in FIG. 3, a head positioning control circuit 32 and an off-tracking detection circuit 36 as firmware. The head positioning control circuit 32 is constituted of a portion of the control system shown in FIG. 3.

Figure 3:
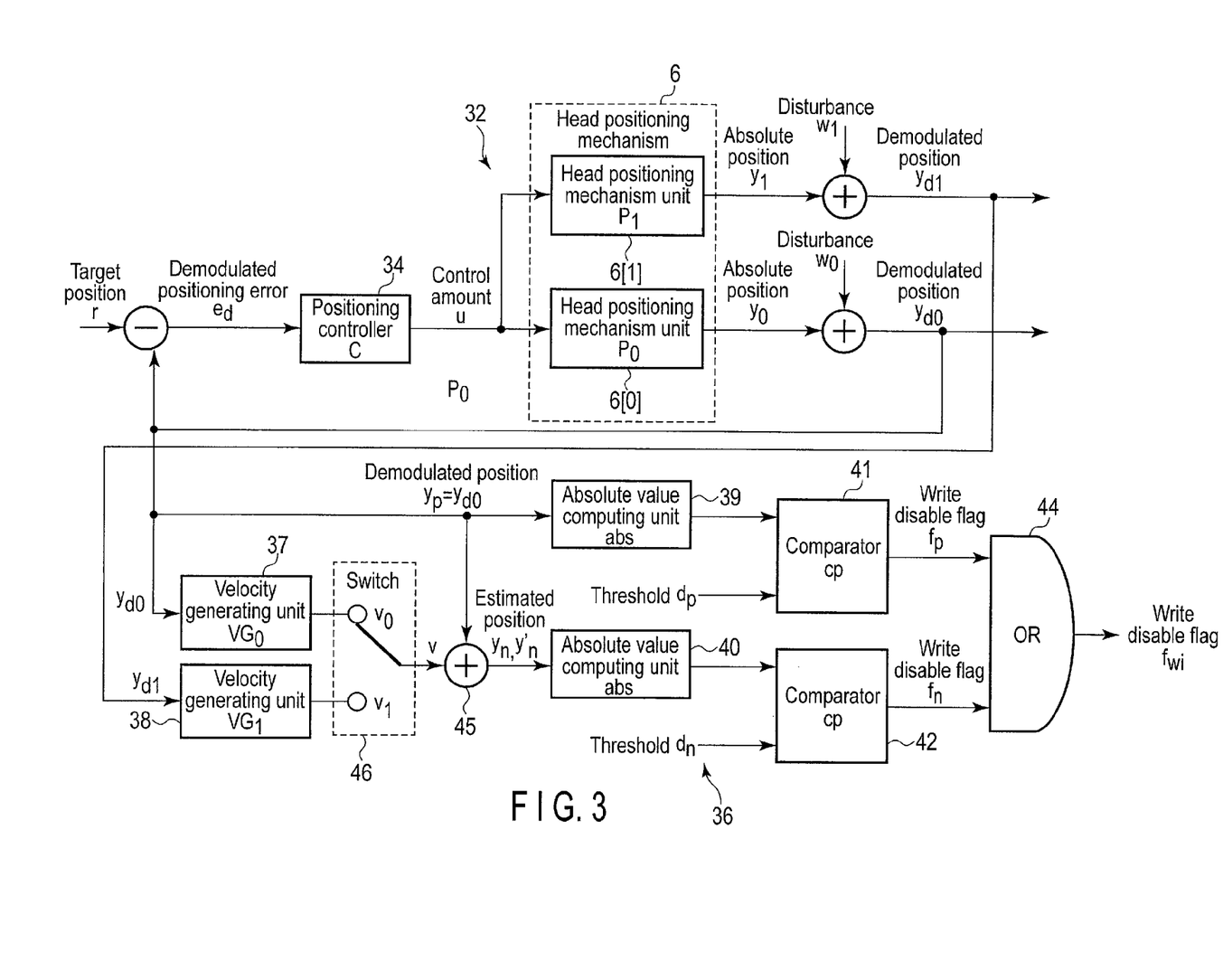
FIG. 3 is a block diagram schematically showing configuration of a head positioning controller and an off-tracking detector shown in FIG. 1.

The head positioning control circuit 32 includes a positioning controller (C) 34 and the positioning controller (C) 34 determines a control amount u based on a demodulated positioning error ed operated as a position error signal (PES). The head positioning control circuit 32 includes the heads H0, H1, the arm mechanism 3, the demodulator circuits 240, 241, the driver IC 19, and the VCM 4 shown in FIG. 1. The heads H0, H1 are moved together by the head positioning mechanism 6. However, one of the heads H0, H1 is selected and the one selected head H0 or H1 is servo-controlled for positioning. Therefore, for convenience of the description, it is assumed that the head positioning mechanism 6 includes, as shown in FIG. 3, head positioning mechanism units $P_0$, $P_1$ controlling the heads H0, H1 respectively and the head positioning mechanism units $P_0$, $P_1$ are selectively switched to perform a control operation. FIG. 3 shows the configuration when the head H0 is selected as the main head. That is, the demodulated positions $y_{d0}$, $y_{d1}$ of the heads H0, H1 become the main demodulated position and the sub-demodulated position and the demodulated velocity $v_0$, $v_1$ of the heads H0, H1 become the main demodulated velocity and the sub-demodulated velocity respectively. The main demodulated position $y_{d0}$ is written into the demodulated position register $y_p$.

The head positioning mechanism 6 (head positioning mechanism unit $P_0$ or $P_1$) shown in FIG. 3 is controlled based on the control amount u and servo-controlled such that the head H0 selected as the main head is positioned in the target position r. The demodulated positioning error ed is operated by a subtracter as a difference between the main demodulated position $y_{d0}$ and the target position r. The demodulated positioning error ed is input into the positioning controller (C) 34 and the positioning controller (C) 34 operates and outputs the control amount u that reduces the demodulated positioning error ed to zero. Then, the head positioning mechanism 6 is driven in response to the control amount u and the heads H0, H1 are moved on the disk 1 in accordance with the control amount u. More specifically, the driver IC 19 supplies a driving current corresponding to the control amount u to the VCM 6. Then, the VCM 6 is driven and the arm mechanism 3 is swung so that the main head, for example, the head H0 is moved toward the target position r on the disk 1. With the movement of the heads H0, H1, the positions of the heads H0, H1 are read as the absolute positions $y_0$, $y_1$ respectively. Then, the disturbances $w_0$, $w_1$ are added to the absolute positions $y_0$, $y_1$ of the heads H0, H1 and the demodulated positions $y_{d0}$, $y_{d1}$ are output. The position demodulation by the head H0 and the head H1 is performed alternately and thus, the main demodulated position $y_{d0}$ and the sub-demodulated position $y_{d1}$ are updated in the timing in which respective phases are mutually shifted by 180° with respect to the servo sampling period.

As described above, the heads H0, H1 are moved by the head positioning mechanism 6 moved by the VCM 4 driven by the one control amount u. In addition, a relative position shift is present between the absolute positions y0, y1 of the heads H0, H1 mounted on separate arms. Further, the disturbances $w_1$, $w_2$ to the heads H0, H1 are not uniform. Thus, the head positioning mechanism unit $P_0$ or $P_1$ is provided for each of the heads H0, H1 and the heads H0, H1 can be considered to be individually driven by these head positioning mechanism units $P_0$, $P_1$. Therefore, the disturbances $w_1$, $w_2$ can be considered to be individually added to the heads H0, H1.

In the head positioning control circuit 32 in FIG. 3, the head H0 shown in FIG. 2 is selected as the main head and set as an object to be controlled and the head H1 shown in FIG. 2 is set as the sub-head and is used to derive a control parameter. The main head H0 is controlled to be positioned in the target position r by the head positioning mechanism unit $P_0$ as the object to be controlled. The off-tracking detection circuit 36 disables writing by referring to the demodulated position register value $y_p$ into which the main demodulated position ($y_{d0}$) of the main head H0 determined in the positioning control is substituted. The off-tracking detection circuit 36 also disables writing by referring to the main and sub-estimated positions $y_n$, $y'_n$ determined by adding the main and sub-demodulated velocity $v_0$, $v_1$ to the demodulated position register value $y_p$ as a reference.

As shown in FIG. 3, the main demodulated position $y_{d0}$ and the sub-demodulated position $y_{d1}$ are input into the off-tracking detection circuit 36 from the head positioning control circuit 32. The off-tracking detection circuit 36 includes an absolute value computing unit 39 that determines an absolute value of the demodulated position register value ($y_p$) and a comparator 41 into which a threshold $d_p$ is input as an object to be compared. If the absolute value of the demodulated position register value ($y_p$) exceeds the threshold $d_p$ in the off-tracking detection circuit 36, the comparator 41 outputs a write disable flag $f_p$ is output to an OR circuit 44. Then, the OR circuit 44 outputs a write disable flag $f_{wi}$ to the W channel 12W to disable data writing by the main head H0.

The off-tracking detection circuit 36 also includes velocity generating units (VG0, VG1) 37, 38 into which the main demodulated position $y_{d0}$ and the sub-demodulated position $y_{d1}$ are input. The velocity generating units (VG0, VG1) 37, 38 operate the main and sub-demodulated velocity $v_0$, $v_1$ from differences between the current demodulated positions $y_{d0}$, $y_{d1}$ and the previous demodulated positions $y_{d0}$, $y_{d1}$ sampled last time. The off-tracking detection circuit 36 also includes a switch 46 that alternately outputs the main and sub-demodulated velocity $v_0$, $v_1$ in predetermined timing in response to, for example, a servo gate signal. The main and sub-demodulated velocity $v_0$, $v_1$ are output from the switch 46 in predetermined timing and added to the demodulated position register value $y_p$ by an adding circuit 45. Thus, the main and sub-estimated positions $y_n$, $y'_n$ are alternately output from the adding circuit 45 in the predetermined timing. The off-tracking detection circuit 36 includes an absolute value computing unit 40 that determines absolute values of the main and sub-estimated positions $y_n$, $y'_n$ and a comparator 42 into which a threshold $d_n$ is input as an object to be compared. If the absolute values of the main and sub-estimated positions $y_n$, $y'_n$ exceed the threshold $d_n$, the comparator 42 outputs a write disable flag $f_n$ to the OR circuit 44. Then, the OR circuit 44 outputs the write disable flag $f_{wi}$ to the W channel 12W to disable data writing by the main head H0.

In the off-tracking detection circuit 36, as described above, the write disable flag $f_{wi}$ is output to the W channel 12W in response to the input of the write disable flag $f_p$ or the write disable flag $f_n$ into the OR circuit 44 to disable data writing by the head H0.

Next, a write control operation of the magnetic disk apparatus will be described with reference to FIG. 4.

Figure 4:
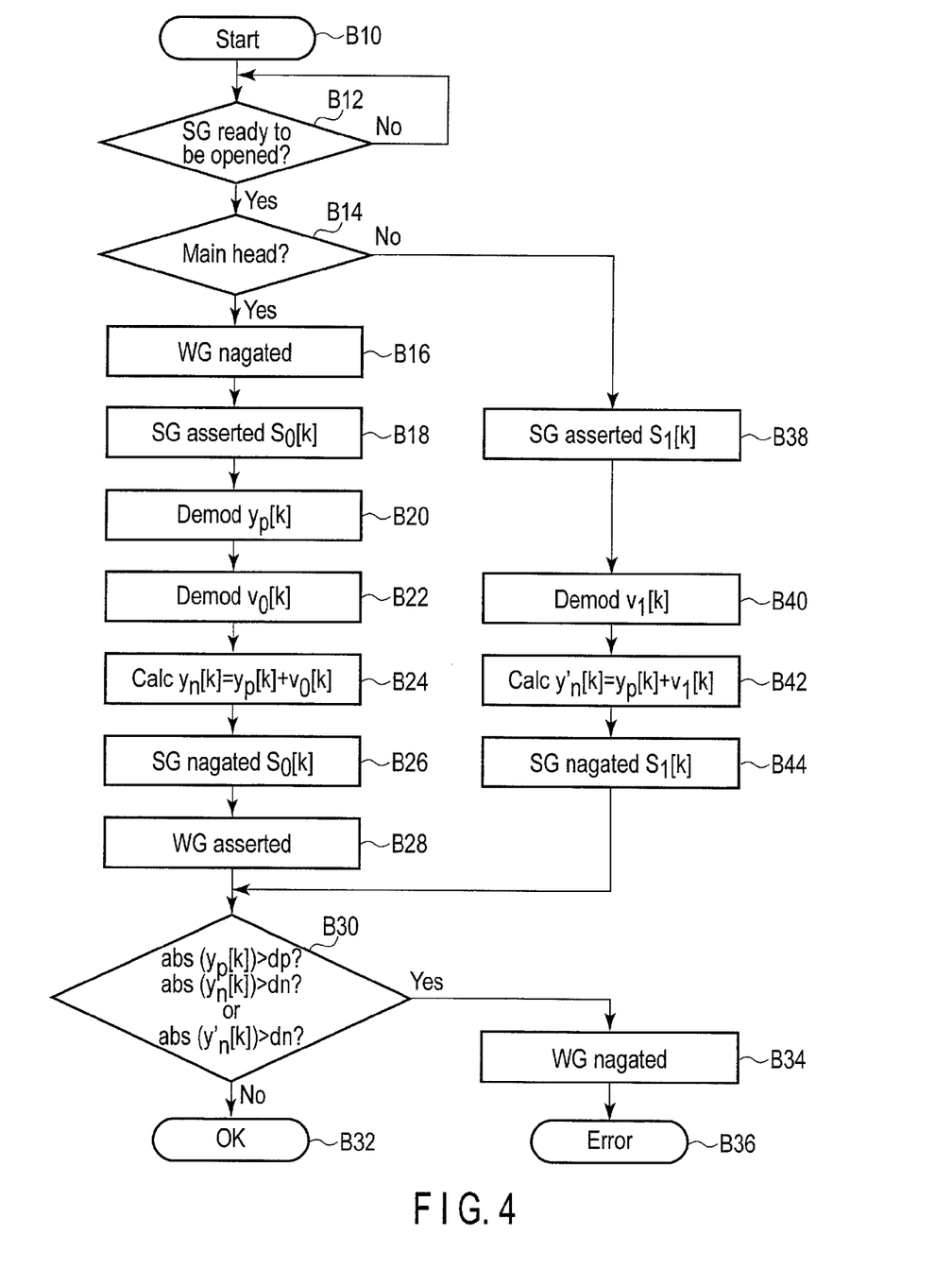
FIG. 4 is a flow chart showing operation to detect off-tracking of a main head in the magnetic disk apparatus shown in FIG. 1.

As shown in FIG. 4, when the write control operation of the magnetic disk apparatus is started (B10), opening of a servo gate is awaited (B12). When, with the rotation of the disk 1, servo gate signals $SG_0$, $SG_1$ are asserted and supplied to the read channels $12R_0$, $12R_1$ to open each servo gate, whether to perform processing of a read signal from the main head H0 as an object to be controlled is checked (B14). If processing of a read signal from the main head H0 is to be performed (Yes in B14), while the servo gate signal $SG_0$ is asserted, a write gate (not shown) provided in the W channel 12W is negated (B16). Thus, data writing by the main head H0 via the W channel 12W is interrupted. While the servo gate signal $SG_0$ is asserted, some servo pattern $S_0[k]$ is started to be demodulated and servo data is sampled (B18). The main demodulated position $y_{d0}$ is determined from servo data obtained while the head H0 is localized in the absolute position $y_0$ and the demodulated position ($y_p[k]=y_{d0}[k]$) is stored in the demodulated position register 56 (B20).

If the previous main demodulated position ($y_{d0}[k-1]$) has been determined in the sampling timing of the servo data prior to the sampling timing of the current servo data, the main demodulated velocity $v_0[k]$ is operated by the velocity generating unit [VG0] 37 from the previous main demodulated position ($y_{d0}[k-1]$) and the current main demodulated position ($y_{d0}[k]$) and stored in the register 54 (B22). Then, the main estimated position $y_n[k](y_n[k]=y_p[k]+v_0[k])$ is calculated from the main demodulated position ($y_p[k]=y_{d0}[k]$) and the main demodulated velocity $v_0[k]$ (B24). Thereafter, the servo gate signal $SG_0$ is negated and demodulating of the current servo pattern $S_0[k]$ is completed (B26). Thus, the write gate (not shown) provided in the W channel 12W is asserted and data writing by the main head H0 via the W channel 12W is restored (B28).

While data being written, whether the absolute value of the demodulated position register value ($y_p[k]$) is larger than the threshold $d_p$ is checked (B30). Also, whether the absolute value of the main estimated position ($y_n[k]$) is larger than the threshold $d_n$ is checked (B30). If the demodulated position register value ($y_p[k]$) is larger than the threshold $d_p$ or the absolute value of the main estimated position ($y_n[k]$) is larger than the threshold $d_n$ (Yes in B30), the write disable flag $f_{wi}$ is output from the OR circuit 44 and the servo gate of the write channel 12W is negated (B34). With the negation of the servo gate, a write error is output from the HDC 10.

On the other hand, if, in block B14, instead of processing of a read signal from the main head H0 as an object to be controlled, processing of a read signal from the sub-head H1 is to be performed (No in B14), while the servo gate signal $SG_1$ is asserted, a servo pattern $S_1[k]$ is started to be demodulated by the head H1 and servo data is sampled (B38). If the previous sub-demodulated position ($y_{d1}[k-1]$) has been determined in the sampling timing of the servo data in the sub-head H1 prior to the sampling timing of the current servo data, the sub-demodulated velocity $v_1[k]$ is operated by the velocity generating unit $VG_2$ 38 from the previous sub-demodulated position ($y_{d1}[k-1]$) and the current sub-demodulated position ($y_{d1}[k]$) and stored in the register 55 (B40). The sub-estimated position $y'_n[k]$ ($y'_n[k]=y_p[k]+v_1[k]$) is calculated from the main demodulated position $y_p[k]$ and the sub-demodulated velocity $v_1[k]$ (B42). If the servo gate signal SG1 is negated, the servo pattern $S_1[k]$, for example, the servo pattern $S_1[0]$ is also negated and sampling of servo data is completed (B44). While the servo gate signal $SG_1$ is asserted, the write gate (not shown) provided in the W channel 12W is maintained asserted and data writing by the main head H0 via the W channel 12W is continued.

While data being written, whether the absolute value of the sub-estimated position ($y'_n[k]$) is larger than the threshold $d_n$ is checked (B30). If the absolute value of the sub-estimated position $y'_n$ is larger than the threshold $d_n$, the write disable flag $f_{wi}$ is output from the OR circuit 44 and the servo gate of the write channel 12W is negated (B34). With the negation of the servo gate, a write error is output from the HDC 10.

If the absolute value of the demodulated position ($y_p[k]$) is not larger than the threshold $d_p$ and the absolute value of the main and sub-estimated positions $y_n[k]$, $y'_n[k]$ are not larger than the threshold $d_n$ (B30), data writing by the main head H0 is continued. Then, the input of the next servo gate signals $SG_0$, $SG_1$ is awaited to restart processing in block B12 and thereafter.

Figure 5:
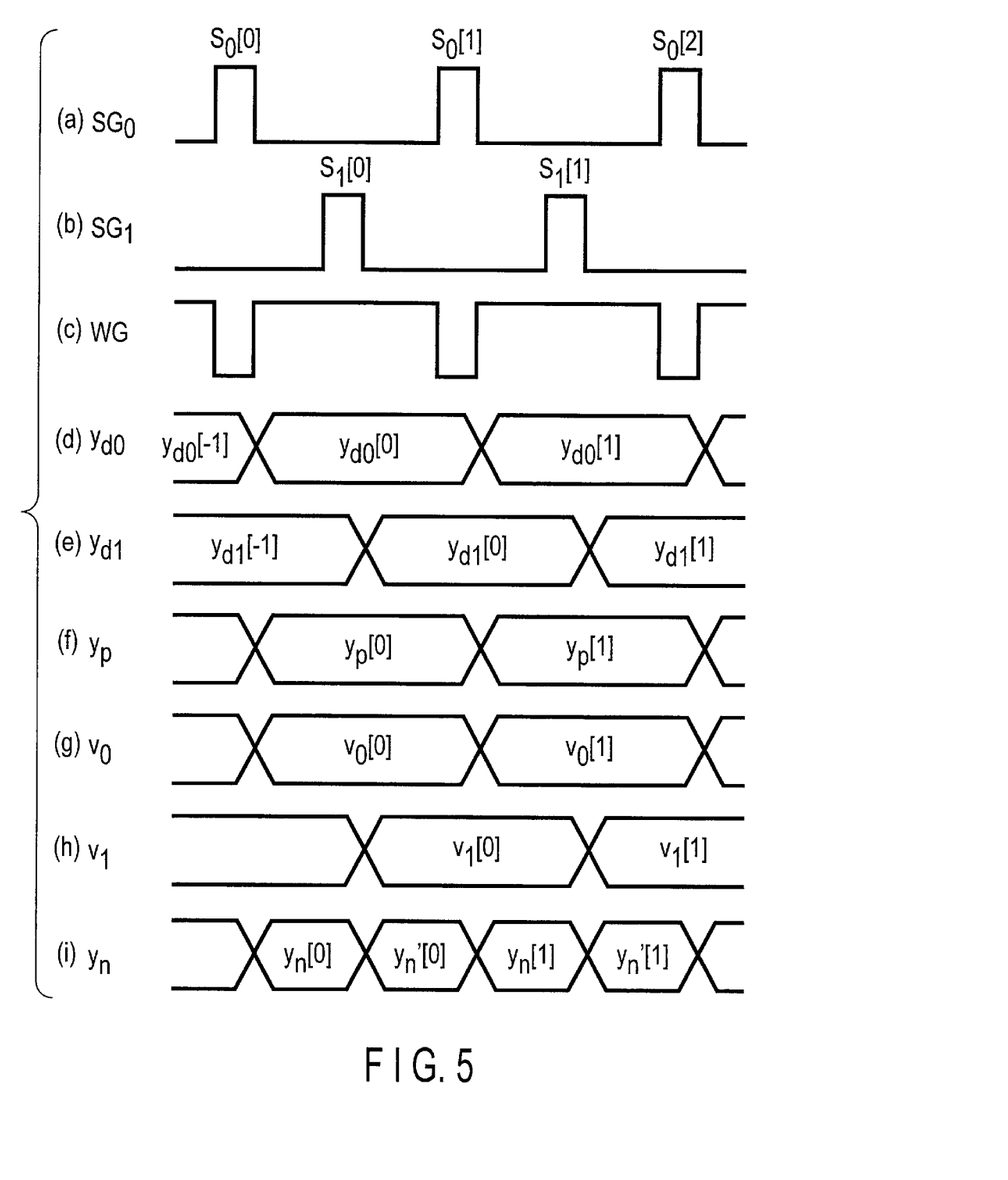
FIG. 5 is a timing chart showing signal waveforms in each unit of the head positioning controller and the off-tracking detector shown in FIG. 3.
Figure 6:
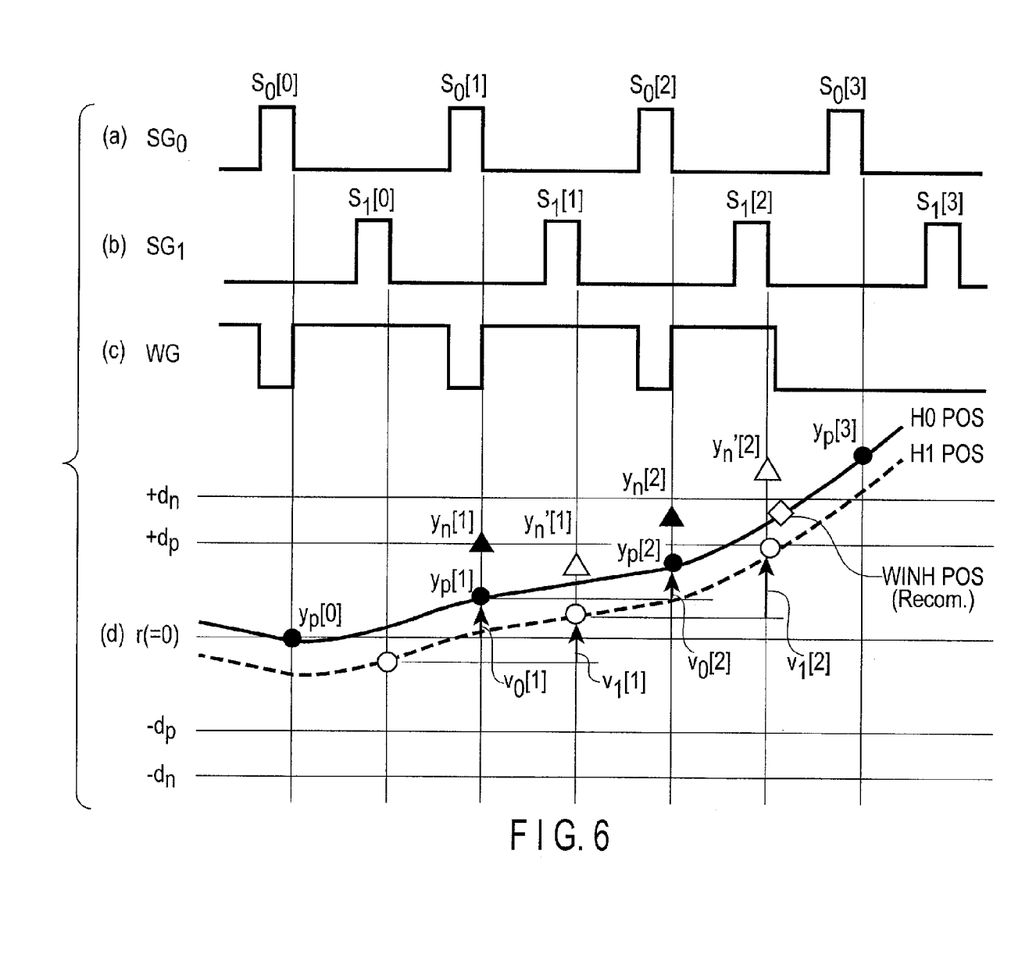
FIG. 6 is a waveform chart showing waveforms of a position error signal e(t) changing with the passage of time under control of the head positioning controller and the off-tracking detector shown in FIG. 3.

In the processing shown in FIG. 4, a signal is given to each unit shown in FIG. 3 as shown in FIGS. 5A to 5C and FIGS. 6A to 6C and data is read as shown in FIGS. 5D to 5I. More specifically, when, as shown in FIGS. 5A and 6A, the servo gate signal $SG_0$ is asserted, as shown in FIG. 5C, a write gate signal WG is negated. Thus, the servo gate of the read channel $12R_0$ is asserted and the write gate of the write channel 12W is negated. When the servo gate signal $SG_0$ is negated, the write gate signal WG is asserted. Thus, the servo gate of the read channel $12R_0$ is negated and the write gate of the write channel 12W is asserted and while the write gate signal WG is asserted, writing by the write head of the main head $H_0$ is continued.

While the servo gate signal $SG_0$ is asserted, servo data is sampled from some servo pattern $S_0[0]$ and, as shown in FIG. 5D, the main demodulated position ($y_{d0}$) as a demodulation result of the absolute position $y_0$ of the main head is determined and stored in the register 52. Here, as shown in FIG. 5F, the main demodulated position $y_{d0}$ is substituted into the demodulated position register value $y_p[0]$ and stored in the register 56.

If the previous main demodulated position ($y_{d0}[-1]$) has been determined by the servo pattern $S_0[-1]$ prior to the servo pattern $S_0[0]$ being sampled, as shown in FIG. 5G, the main demodulated velocity $v_0[0]=y_{d0}[0]-y_{d0}[-1]$ is determined by the velocity generating unit $VG_0$ 37 from a difference between the current main demodulated position $y_{d0}[0]$ and the previous main demodulated position $y_{d0}[-1]$ and stored in the register 54. Also, as shown in FIG. 5I, the main estimated position $y_n[0]$ is determined from the demodulated position register value $y_p[0]$ and the main demodulated velocity $v_0[0]$ and stored in the register 59.

When, as shown in FIGS. 5B and 6B, the servo gate signal $SG_1$ is asserted, as shown in FIG. 5C, the write gate signal WG is maintained asserted and a write operation by the write head of the main head H0 is maintained. Then, while the servo gate signal $SG_1$ is asserted, servo data is sampled from some servo pattern $S_1[0]$ by the sub-head H1 and, as shown in FIG. 5E, the sub-demodulated position $y_{d1}$ as a demodulation result of the absolute position $y_1$ of the sub-head is determined and stored in the register 53. If the previous sub-demodulated position $y_{d1}[k-1]$ has been determined by the servo pattern $S_1[-1]$ prior to the current servo pattern $S_1[0]$ being sampled, as shown in FIG. 5H, the sub-demodulated velocity $v_1[0]=y_{d1}[0]-y_{d1}[-1]$ is operated by the velocity generating unit $VG_2$ 38 from the previous sub-demodulated position $y_{d1}[k-1]$ and the current sub-demodulated position $y_{d1}[0]$ and stored in the register 55. Also, the sub-estimated position $y'_n[0]$ is determined from the demodulated position register value $y_p[0]$ and the sub-demodulated velocity $v_1[0]$ and stored in the register 59.

Similarly, while the servo gate signal $SG_0$ is asserted, servo data is sampled from the next servo pattern $S_0[1]$ and the main demodulated position $y_{d0}[1]$ is determined from the main absolute position $y_0$ and stored in the register 52. Here, the main demodulated position $y_{d0}$ is substituted into the demodulated position $y_p[1]$ and stored in the register 56. Then, as shown in FIG. 5G, the main demodulated velocity $v_0[1]$ is determined from a difference between the main demodulated position $y_{d0}[0]$ determined from the servo pattern $S_0[0]$ and the current demodulated position $y_{d0}[1]$ and stored in the register 54. Also, the main estimated position $y_n[1]$ is determined from the demodulated position register value $y_p[1]$ and the main demodulated velocity $v_0[1]$ and stored in the register 59.

Similarly, while the servo gate signal $SG_1$ is asserted, the sub-demodulated position $y_{d1}[1]$ is determined from the next servo pattern $S_1[1]$ by the sub-head H1. Then, as shown in FIG. 5H, the sub-demodulated velocity $v_1[1]$ is operated from the previous sub-demodulated position $y_{d1}[0]$ and the current sub-demodulated position $y_{d1}[1]$ and stored in the register 55. As shown in FIG. 5I, the sub-estimated position $y'_n[1]$ is determined from the main demodulated position register value $y_p[1]$ and the demodulated velocity $v_0[1]$ and stored in the register 59.

With the above processing, as shown in FIG. 6D, the demodulated positions $(y_p[0]$ to $y_p[k])$ as indicated by black circles on a solid line (H0 POS) successively in accordance with the assertion of the servo gate signal $SG_0$. The solid line (H0 POS) represents the displacement from the target value r of the head H0. Also, as indicated by black triangles, the main estimated positions $(y_n[1]$ to $y_n[k])$ are determined from the demodulated positions $(y_p[0]$ to $y_p[k])$ and the demodulated velocity $(v_0[1]$ to $v_0[k])$ in the detection timing of the demodulated positions $(y_p[0]$ to $y_p[k])$.

Also with the above processing, regarding the sub-head H1, as shown in FIG. 6D, the sub-demodulated velocity $(v_1[0]$ to $v_1[k])$ are determined as indicated by white circles on a broken line (H1 POS) and also the sub-estimated positions $(y'_n[1]$ to $y'_n[k])$ are determined from the main demodulated positions $(y_p[1]$ to $y_p[k])$ and the sub-demodulated velocity $(v_1[0]$ to $v_1[k])$, as indicated by white triangles, in the detection timing of the sub-demodulated velocity $(v_1[0]$ to $v_1[k])$. The broken line (H1 POS) represents the displacement from the target value r of the head H1.

As shown in FIG. 6D, the demodulated position $y_p[1]$ is smaller than the threshold $(+d_p)$ $(y_p[1]<+d_p)$ and also the estimated position $y_n[1]$ is smaller than the threshold $(+d_n)$ $(y_n[1]<+d_n)$. Therefore, the write disable flags $f_p$, $f_n$ are not generated. Similarly, the demodulated position $y_p[2]$ is smaller than the threshold $(+d_p)$ $(y_p[2]<+d_p)$ and also the estimated position $y_n[2]$ is smaller than the threshold $(+d_n)$ $(y_n[2]<+d_n)$. Therefore, similarly, the write disable flags $f_p$, $f_n$ are not generated.

However, the estimated position $y'_n[2]$ while reading the servo pattern $S_1[2]$ exceeds the threshold $(+d_n)$ and an occurrence of off-tracking is determined in the next sample. Then, the write disable flag $f_n$ based on the estimated position is asserted, the write disable signal $f_{wi}$ is asserted, and the write gate signal WG is negated so that a write operation by the write amplifier in the write channel 12W is stopped.

In the above embodiment, as described above, the position demodulation by the head H0 and the head H1 is alternately performed and thus, the position demodulated value $y_{d0}$ and the position demodulated value $y_{d1}$ are updated in the timing in which respective phases are mutually shifted by 180° with respect to the sampling period. The demodulated positions $y_{d0}$, $y_{d1}$ of the head H0 and the head H1 are represented by $(y_{d0}=P_0\cdot u+w_0)$ and $(y_{d1}=P_1\cdot u+w_1)$ respectively. $P_0$ and $P_1$ are transfer functions of the head H0 and the head H1 respectively and if $P_1$ is set as $=P_0+\Delta P$ with $\Delta P$ being a difference between the transfer functions $P_0$, $P_1$ of the head H0 and the head H1, a demodulated velocity difference of both is represented by $$d(y_{d1})/dt-d(y_{d0})/dt=d(\Delta P\cdot u+w_1-w_0)/dt.$$

$y_{d1}$ is a sub-demodulated position, $y_{d0}$ is a sub-demodulated position, $d(y_{d1})/dt$ represents the demodulated velocity $v_1$, and $d(y_{d0})/dt$ represents the demodulated velocity $v_0$. The transfer function difference $\Delta P$ of the head H0 and the head H1 is minute and an input response ($\Delta P\cdot u$) thereof is considered to be sufficiently smaller than a displacement disturbance difference $(w_1-w_0)$ caused by servo writing and mounting errors between the head H0 and the head H1 and thus, the demodulated velocity difference is approximated as $$d(y_{d1})/dt-d(y_{d0})/dt\approx d(w_1-w_0)/dt.$$

Further, displacement disturbances $w_0$, $w_1$ are mostly DC components and thus, $$d(y_{d1})/dt-d(y_{d0})/dt\approx 0$$

can be considered as a further approximation. Therefore, the estimated position of the head H0 can be obtained like $$y_{n0}=y_{d0}+\int\{d(y_{d0})/dt\}dt\approx y_{d0}+\int\{d(y_{d1})/dt\}dt$$

by adding a time integral of the demodulated velocity $v_0$ of the head H0 or the demodulated velocity $v_1$ of the head H1 to the demodulated position of the head H0.

When, in such a servo system, high demodulated velocity that allow to ignore the transfer function difference $\Delta P$ of the head H0 and the head H1 arise in the head H0 and the head H1, the demodulated velocity of the head H0 and the head H1 can be considered to be approximately equal.

Based on the above consideration, the servo system shown in FIG. 3 will be discussed. In the servo system shown in FIG. 3, the demodulated velocity $v_0$, $v_1$ of the respective heads are determined by the velocity generating units (VG0, VG1) 37, 38 from the demodulated positions $y_{d0}$, $y_{d1}$ demodulated by the respective heads. More specifically, the velocity generating units (VG0, VG1) 37, 38 calculates the amounts of change between the demodulated position in the last servo sample and the demodulated position in the current servo sample as the demodulated velocity $v_0$, $v_1$. The switch 46 selects the demodulated velocity $v_0$ as input when the demodulated position $y_{d0}$ is updated and the demodulated velocity $v_1$ as input when the demodulated position $y_{d1}$ is updated. The switch 46 outputs one of the demodulated velocity $v_0$, $v_1$ as the demodulated velocity v. The main estimated position $y_n$ $(y_n[k]=y_p[k]+v_0[k])$ and the sub-estimated position $y'_n$ $(y'_n[k]=y_p[k]+v_1[k])$ in the next sample of the active head H0 are determined from the demodulated position $y_p$ and the demodulated velocity $v_0$, $v_1$ and if the absolute value thereof exceeds the threshold $d_n$, the write disable flag $f_n$ is asserted. In addition to the write disable flag $f_p$ generated based on the demodulated position $y_p$ corresponding to the current position of the main head H0, the write disable flag $f_n$ is generated from the main estimated position $y_n$ and the sub-estimated position $y'_n$ expected to be reached by the main head H0. Then, the write disable flag $f_{wi}$ is obtained from a logical sum of the write disable flag $f_p$ and the write disable flag $f_n$.

According to the above embodiment, the estimated positions $y'_n[1], y'_n[2] \ldots y'_n[k]$ are determined between timing of operating the estimated positions $y_n[1], y_n[2] \ldots y_n[k]$. From the above, the write disable flag $f_n$ can be caused to be output based on the estimated positions $y_n[1], y_n[2] \ldots y_n[k]$ and the estimated positions $y'_n[1], y'_n[2] \ldots y'_n[k]$. Thus, even if the main head approaches the adjacent track due to a rapid velocity change of the main head H$_0$ during write operation of the main head, the estimated position $y'_n[k-1]$ is estimated also while being positioned between the estimated positions $y_n[k-1]$ and $y_n[k]$ and the write disable flag $f_n$ is output. Therefore, a situation in which existing write data on the adjacent track is deleted based on a rapid velocity change of the main head H$_0$ can reliably be prevented.

When off-tracking occurs accompanying a high velocity of the main head H0, as described above, the detection rate of an off-tracking state resulting from the velocity, that is, the rate of write disable processing can be improved by reading position error information by the sub-head that is different from the main head operating to write.

[Modification]

In the above embodiment, phases of servo pattern signals read from servo patterns accessed by the two heads H0, H1 are set to be shifted from each other by 180°. In the modification, three heads including still another head H2, in addition to the two heads H0, H1, are used. Incidentally, instead of three heads, four or more heads may be used to operate estimated positions. When the three heads H0, H1, H2 are used, three recording surfaces selected from a plurality of disks 1 are used and phases of servo pattern signals from the recording surfaces may be set to be shifted from each other by 120°. When four heads H0, H1, H2, H3 are used, four recording surfaces are used and phases of servo pattern signals from the recording surfaces may be set to be shifted from each other by 90°.

Figure 7:
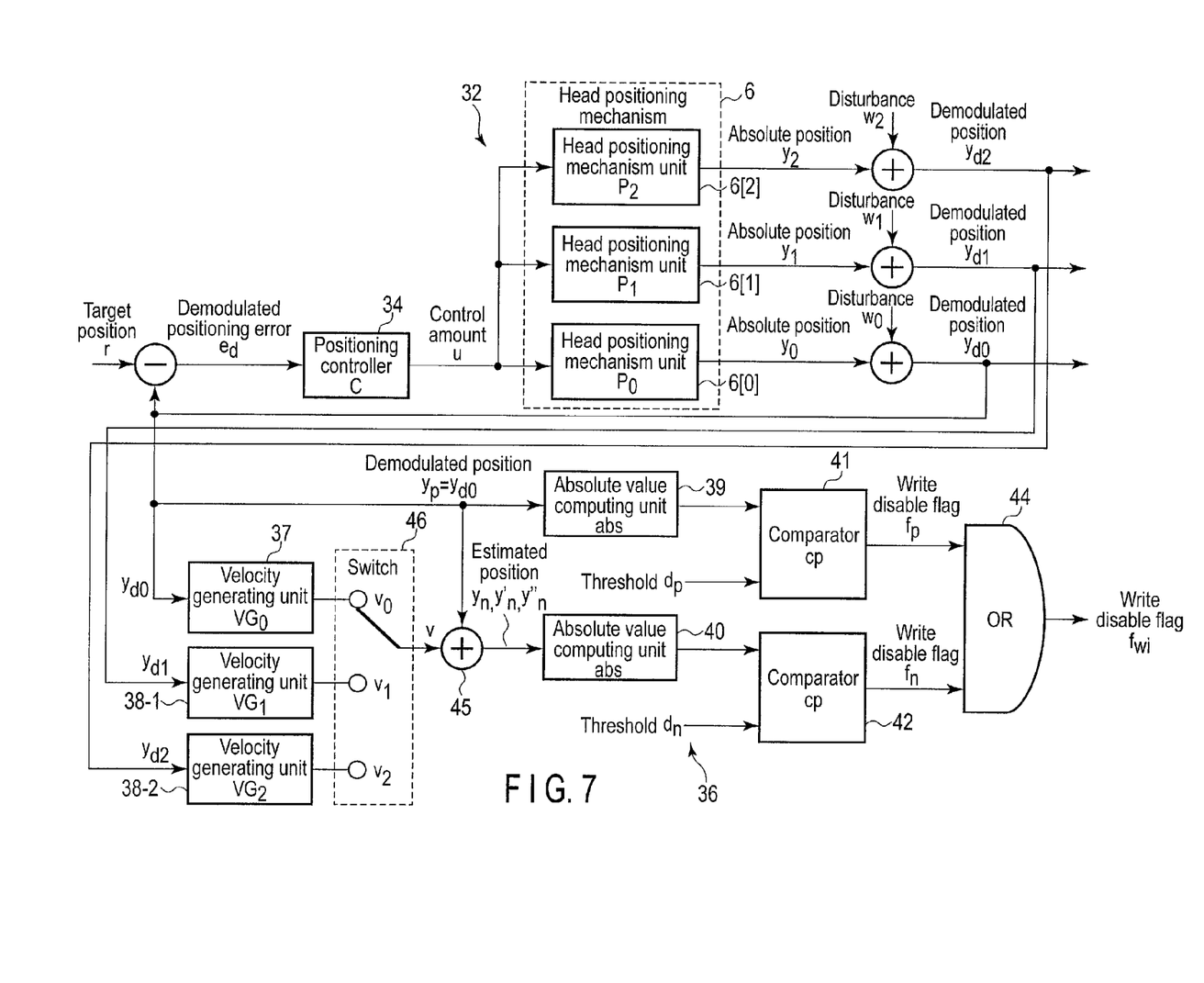
FIG. 7 is a block diagram schematically showing configuration of a head positioning controller and an off-tracking detector according to a modification of the embodiment shown in FIG. 3.

In a servo system using the three heads H0, H1, H2, as shown in FIG. 7 (configured here by setting the head H0 as the main head and the heads H1, H2 as sub-heads), a positioning mechanism 6 that determines the head positions of the heads H0, H1, H2 include positioning mechanisms P0, P1, P2 and demodulated positions $y_{d0}, y_{d1}, y_{d2}$ are output from the heads H0, H1, H2. Then, main and sub-demodulated velocity $v_0, v_1, v_2$ are output from velocity generating units (VG0, VG1, VG2) 37, 38-1, 38-2 to a switch 46. The main and sub-demodulated velocity $v_0, v_1, v_2$ are output from the switch 46 in predetermined timing and added to a demodulated position register value $y_p[k]$ by an adding circuit and a main estimated position $y_n$ and sub-estimated positions $y'_n, y''_n$ are sequentially output in predetermined timing from the adding circuit.

According to the modification, first and second sub-estimated positions $y'_n[1], y'_n[2] \ldots y'_n[k]$ and $y''_n[1], y''_n[2] \ldots y''_n[k]$ are determined between timing of operating the main estimated positions $y_n[1], y_n[2] \ldots y_n[k]$. Therefore, a write disable flag $f_n$ can be caused to be output based on the main estimated positions $y_n[1], y_n[2] \ldots y_n[k]$ and the two sub-estimated positions $y'_n[1], y'_n[2] \ldots y'_n[k]$ and $y''_n[1], y''_n[2] \ldots y''_n[k]$ and even if the main head H0 approaches the adjacent track due to a rapid velocity change thereof, a situation in which existing write data on the adjacent track is deleted can more reliably be prevented by the write disable flag $f_n$.

As described above, HDD in the embodiment includes a plurality of head surfaces and each head surface has a servo pattern recorded in a position shifted in the circumferential direction from each other on the recording surface. Then, while some head write data on a recording surface, another head can acquire positioning information from another recording surface. Therefore, in addition to the timing of reproduction of the servo pattern on a recording surface being written on, the estimated position in some servo sample can also be updated in reproduction timing in which a servo pattern on another recording surface is reproduced by another head. As a result, even if a rapid velocity disturbance occurs between servo samples, an occurrence of an off-tracking state can be detected in an earlier stage to stop a write operation.

Therefore, by using positioning information of heads other than write heads obtained from a staggered servo and a multi-channel and combining the information with positioning information of the write heads, the rate of updating estimated positions can be increased so that off-tracked writing can be reliably prevented.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk apparatus comprising:
   a first medium having a first disk surface on which first servo patterns are recorded, wherein the first servo patterns are to be read at a first timing and data is to be wrote on the first disk surface by using a first head;
   a second medium having a second disk surface on which second servo patterns are recorded, wherein the second servo patterns are to be read at a second timing different from the first timing by using a second head; and
   a controller to control the first head based on a first demodulated position and a control target position, the first demodulated position being obtained by demodulating the first servo pattern, wherein
   the controller
   calculates a first estimated demodulated position from the first demodulated position and a first demodulated velocity based on the first servo patterns,
   calculates a second estimated demodulated position from the first demodulated position and a second demodulated velocity based on the second servo patterns, each of the second servo patterns being read after reading each of the first servo pattern, and
   stops data writing operation of the first head in accordance with one of the first and second estimated demodulated positions exceeding a particular threshold.

2. The disk apparatus according to claim 1, wherein the first medium and the second medium are a same medium or different media.

3. The disk apparatus according to claim 1, wherein
   the controller comprises
   a first circuit to demodulate the first demodulated positions based on at least one of the first servo patterns and the first demodulated velocity based on at least two of the first servo patterns and a second circuit to demodulate the second demodulated velocity based on at least two of the second servo patterns.

4. The disk apparatus according to claim 1, further comprising:
a third medium having a third disk surface on which third servo patterns are recorded, wherein the third servo patterns are to be read at a third timing different from the first and the second timings by using a third head, wherein
the controller
calculates a third estimated demodulated position from the first demodulated position and a third demodulated velocity based on the third servo patterns, each of the third servo patterns being read after reading each of the first and second servo patterns, and
stops the data writing operation of the first head in accordance with one of the first, second, and third estimated demodulated positions exceeding the particular threshold.

5. The disk apparatus according to claim 4, wherein
the controller comprises
a first circuit to demodulate the first demodulated positions based on at least one of the first servo patterns and the first demodulated velocity based on at least two of the first servo patterns,
a second circuit to demodulate the second demodulated velocity based on at least two of the second servo patterns, and
a third circuit to demodulate the third demodulated velocity based on at least two of the third servo patterns.

6. The disk apparatus according to claim 1, wherein
the controller comprises
a first register to store the first demodulated position and
a second register to store the first estimated demodulated position, and wherein the controller
updates the first estimated demodulated position of the second register with a second estimated demodulated position which is obtained from the first demodulated position of the first register and the second demodulated velocity, and
stores the updated first estimated demodulated position in the second register.

7. A method of controlling a positioning of a first head on a first disk surface in a disk apparatus comprising
a first medium having the first disk surface on which first servo patterns are recorded, wherein the first servo patterns are to be read at a first timing and data is to be wrote on the first disk surface by using the first head, and
a second medium having a second disk surface on which second servo patterns are recorded, wherein the second servo patterns are to be read at a second timing different from the first timing by using a second head, the method comprising:
controlling the first head based on a first demodulated position and a control target position, the first demodulated position being obtained by demodulating the first servo pattern calculating a first estimated demodulated position from the first demodulated position and a first demodulated velocity based on the first servo patterns,
calculating a second estimated demodulated position from the first demodulated position and a second demodulated velocity based on the second servo patterns, each of the second servo patterns being read after reading each of the first servo pattern, and
stopping data writing operation of the first head in accordance with one of the first and second estimated demodulated positions exceeding a particular threshold.

8. The method according to claim 7, wherein the first medium and the second medium are a same medium or different media.

9. The method according to claim 7, further comprising:
demodulating the first demodulated positions based on at least one of the first servo patterns and the first demodulated velocity based on at least two of the first servo patterns and
demodulating the second demodulated velocity based on at least two of the second servo patterns.

10. The method according to claim 7, wherein the apparatus further comprises a third medium having a third disk surface on which third servo patterns are recorded, wherein the third servo patterns are to be read at a third timing different from the first and the second timings by using a third head, the method further comprising:
calculating a third estimated demodulated position from the first demodulated position and a third demodulated velocity based on the third servo patterns, each of the third servo patterns being read after reading each of the first and second servo patterns, and
stopping the data writing operation of the first head in accordance with one of the first, second, and third estimated demodulated positions exceeding the particular threshold.

11. The method according to claim 10, further comprising:
demodulating the first demodulated positions based on at least one of the first servo patterns and the first demodulated velocity based on at least two of the first servo patterns,
demodulating the second demodulated velocity based on at least two of the second servo patterns, and
demodulating the third demodulated velocity based on at least two of the third servo patterns.

12. The method according to claim 7, further comprising:
storing the first demodulated position in a first register
storing the first estimated demodulated position in a second register
updating the first estimated demodulated position of the second register with a second estimated demodulated position which is obtained from the first demodulated position of the first register and the second demodulated velocity, and
storing the updated first estimated demodulated position in the second register.

* * * * *